United States Patent Office 3,498,753
Patented Mar. 3, 1970

3,498,753
APPARATUS FOR THERMAL CRACKING OF HYDROCARBON
Hiroshi Hokari, Tokyo, Takeo Koide, Takaoka-shi, and Shigemitu Koyama, Yokohama, Japan, assignors to The Japanese Geon Company, Ltd., Tokyo, Japan, a corporation of Japan
Filed June 27, 1967, Ser. No. 649,183
Claims priority, application Japan, July 4, 1966, 41/42,966
Int. Cl. C10g 9/04; C07c 11/04, 11/24
U.S. Cl. 23—277                    3 Claims

ABSTRACT OF THE DISCLOSURE

Method and apparatus for thermal cracking of a hydrocarbon which comprises a cylindrical combustion chamber, burners provided inside the combustion chamber, a tubular reaction chamber provided adjacent to the combustion chamber, a quenching device for cooling a cracked gas and nozzle for feeding hydrocarbon into the combustion chamber, characterized in that a connecting portion of said combustion chamber to said reaction chamber forms a reverse frustoconical space, and said hydrocarbon feed nozzle is so provided that the opening or slit at the tip thereof is located inside said reverse frustoconical space and is directed to the peripheral wall of said reverse frustoconical space.

---

Figure 1:
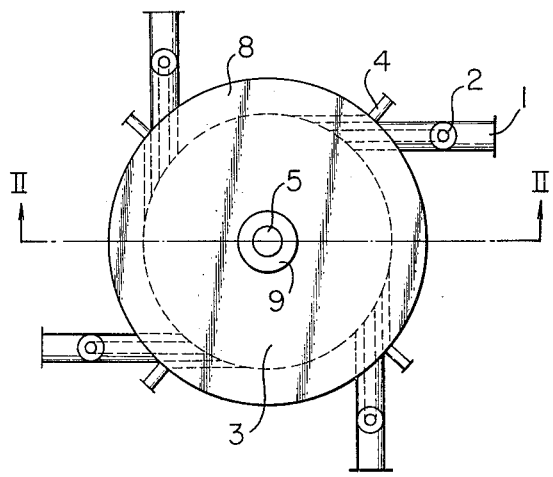

This invention relates to method and apparatus for producing a gas mixture containing acetylene and ethylene by thermal cracking of a hydrocarbon. More particularly, this invention relates to a method and apparatus for thermal cracking of a hydrocarbon for producing at a high efficiency a gas mixture containing acetylene and ethylene by mixing a hyrrocarbon such as methane, propane and naphtha with a high temperature combustion gas and thermally cracking the mixture.

Many methods and apparatuses for thermal cracking of a hydrocarbon for producing a gas mixture containing acetylene and ethylene by mixing a hydrocarbon with a high temperature combustion gas have hitherto been proposed. These thermal cracking apparatuses are normally made of refractory materials or metals in their entireties. Although an apparatus using a refractory material has an advantage that heat loss of the apparatus is little, there are disadvantages that because the fire resistant temperature of the refractory material usable in a combustion chamber is at most 2000° C., it is necessary to introduce a large amount of steam for the protection of said material, a refractory material per se is expensive, and considerable care is required for the protection thereof and when a furnace becomes large, its construction becomes very difficult. On the other hand, an apparatus made of a metal in its entireties has an advantage that its manufacture is easy and the manufacturing cost is inexpensive; however, it has disadvantages that because it is necessary to cool the apparatus by covering the entire apparatus with a cooling jacket, heat loss is large and amounts of the fuel and oxygen used increase. Accordingly an amount of a cracked gas increases, acetylene and ethylene contents in said cracked gas become small, apparatuses for treating the cracked gas must become large and consuming amounts of steam for heating, water for cooling and power increase.

Also, because thermal cracking of a hydrocarbon is carried out within a very short time of $\frac{1}{1000}$ to $\frac{1}{100}$ second, complete quick mixing of a high temperature combustion gas with a hydrocarbon becomes an indispensable condition for obtaining at high yields acetylene and ethylene, however, by the conventional process said mixing is not necessarily carried out sufficiently.

An object of this invention is to improve these defects in the prior arts. Other objects of this invention will become apparent from the following description. These objects of this invention are achieved by using an apparatus which comprises a cylindrical combustion chamber made of a heat resistant steel whose periphery is so constituted as to enable cooling, a group of burners provided at a position such that a combustion gas forms a swirling stream inside said combustion chamber, for instance, in a tangential direction to the side wall of said combustion chamber, a tubular reaction chamber made of a refractory material provided adjacent to said combustion chamber, a quenching device for cooling a cracked gas at the exit portion of said reaction chamber and a raw material hydrocarbon feed nozzle provided inside said combustion chamber from outside by penetrating shaid chamber, characterized in that the connecting portion of said combustion chamber to said reaction chamber forms a reverse frustoconical space and said hydrocarbon feed nozzle is so provided that the tip thereof is located inside said reverse frustoconical space. Because the apparatus of this invention has such constitution, a swirling stream of a high temperature gas formed inside said combustion chamber by feeding a fuel gas and oxygen (or a fuel gas, oxygen and steam) from the group of burners falls down while swirling inside said reverse frustoconical space and as the passage is gradually narrowed it is gradually accelerated. Said swirling stream in such an accelerated state is made to collide and uniformly mix with a preheated hydrocarbon injected toward the wall of the reverse frustoconical space (preferably at a right angle therewith) from the hydrocarbon feed nozzle. The resultant mixed gases are made to contact with each other at a temperature of 500°–1500° C. for a residence time (reaction time) of $\frac{1}{1000}$ to $\frac{1}{100}$ second inside the reaction chamber thereby being thermal cracked to form a cracked gas mixture containing acetylene and ethylene.

Figure 2:
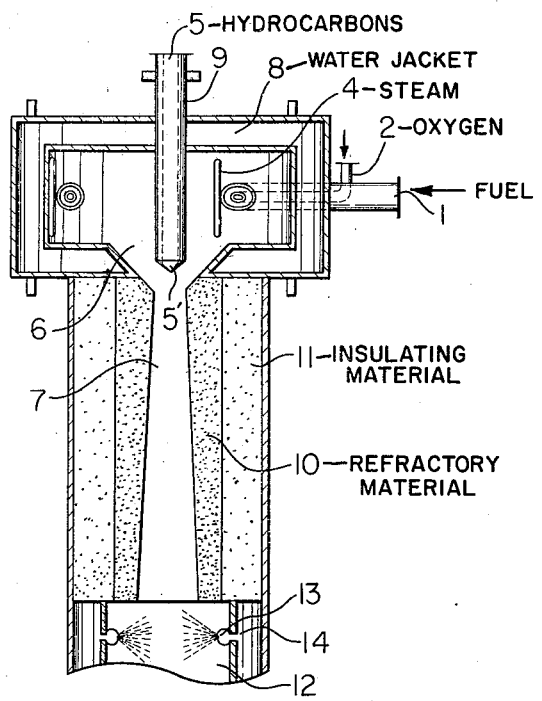
Figure 3:
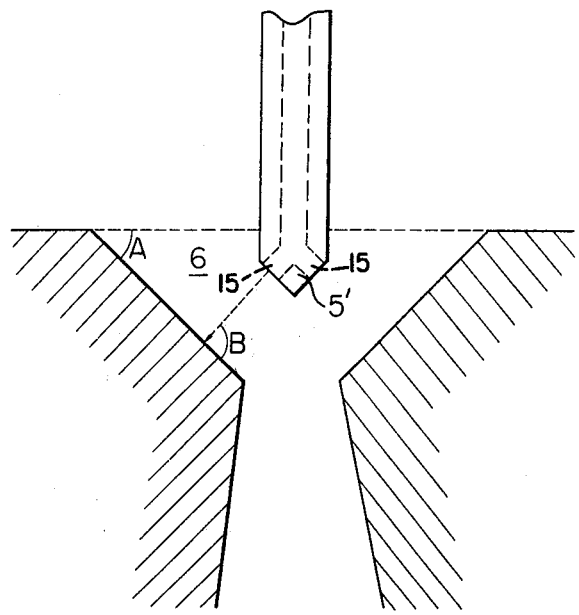

The accompanying drawings shown a preferable embodiment of such an apparatus of this invention. FIG. 1 is a plan view. FIG. 2 is a sectional view taken along line II—II of FIG. 1. FIG. 3 is an enlarged view of a reverse frustoconical space shown in FIG. 2.

When the apparatus of this invention is further concretely explained based on the drawings with reference to its preferable embodiment, in FIG. 1 and FIG. 2 a fuel (or a fuel and steam) is fed from a nozzle 1 of a double-tube burner and oxygen is fed from a nozzle 2 thereof from a tangential direction to the side wall inside a combustion chamber 3, respectively where a high-temperature, high-speed swirling gas stream is formed, at the same time, from a slit-like nozzle 4 provided longitudinally at the internal side wall of the combustion chamber 3 steam is fed in a filmy state along the surface of said side wall thereby a heat loss inside the combustion chamber is reduced. It is preferable that a plurality of nozzles 1, 2 and 4 are provided at regular intervals. On the other hand, a hydrocarbon which is a raw material to be cracked is preheated thereafter made to inject toward the peripheral wall of a reverse frustoconical space 6 from the tip 5' of the nozzle 5 located inside the reverse frustoconical space 6. The hydrocarbon so introduced into the apparatus is uniformly mixed with a high-temperature, high-speed swirling gas stream formed at the combustion chamber 3 and cracked at a fanwise tubular reaction chamber 7. The length of the reaction chamber 7 is so decided that yields of acetylene and ethylene become maximum at the exit of the reaction chamber. The cracked gas mixture containing acetylene and ethylene is quenched by injecting a cooling liquid from a nozzle 13 at a quench chamber 12.

The combustion chamber 3, the hydrocarbon feed nozzle 5 and the quench chamber 12 are provided with jackets (8, 9 and 14, respectively) and before ignition, water is flown inside the jackets to cool the combustion chamber, the nozzle and the quench chamber. The reaction chamber 7 is constituted by a refractory material 10 and an adiabatic material 11 whereby heat loss at the reaction chamber is made to become minimum.

It is preferable that the inclination of the wall surface of the reverse frustoconical space to the lower wall surface of the combustion chamber (A in FIG. 3) is 30° to 60° and the inclination of about 45° is most preferable. The nozzle feeding the material hydrocarbon is provided at such a position that the tip 5' and opening or slit 15 thereof is contained inside the reverse frustoconical space. At said tip an opening or a slit in any direction is provided so as to inject the hydrocarbon toward the peripheral walls of the reverse frustoconical space. The injecting angle of the hydrocarbon to the wall (B in FIG. 3) is preferably 30° to 150°, and normally with the angle of 90° a sufficient result is obtained.

Ratio of height to diameter of the cylindrical combustion chamber is preferably about 2:1 to 1:4 with a view to minimizing heat loss of the combustion chamber and the ratio of 1:1 is ideal. When the ratio becomes less than 1:4, the surface area increases, resulting in large heat loss, being not economical. When, as mentioned above, from the nozzle (slit in a longitudinal direction) 4 steam is fed in a filmy state along the internal side surface of the combustion chamber, because the film of said steam has an adiabatic effect, it is possible to make the heat loss small as compared with the case of the conventional apparatus made of a metal. In this case, the amount of the steam is sufficient with about one half of that of the conventional apparatus made of a refractory material. Also, when the capacity of the cracking apparatus becomes large, the heat transfer area of the combustion chamber becomes small relatively to the capacity, accordingly heat loss becomes small.

The large characteristics of the apparatus of this invention are that due to providing of the reverse frustoconical space between the combustion chamber and the reaction chamber, it is possible to make smooth flow of the gas inside the combustion chamber and to make small the pressure drop, by making the high-temperature, high-speed stream of a swirling gas formed at the reverse frustoconical space meet with the stream of a hydrocarbon injected toward the wall surface of the reverse frustoconical space, it is possible to carry out completely uniform mixing of a high-temperature combustion gas with a hydrocarbon which is the most important condition in a thermal cracking reaction of this kind as compared with the case of the conventional apparatus, and as a result it is possible to obtain acetylene and ethylene at high yields. Further, because a hydrocarbon is fed inside this reverse frustoconical space, the hydrocarbon is not entangled in the high-temperature gas stream inside the combustion chamber and formation of free carbon decreases remarkably.

Again, in the apparatus of this invention the combustion chamber becoming a very high temperature (more than 2000° C.) is constituted by a metal which can be cooled from outside, however, the reaction chamber is constituted by a refractory material. Accordingly, the apparatus of this invention has small heat loss as compared with the conventional apparatus made of a metal in entirety, moreover, it is free from a defect of the conventional metal apparatus that a hydrocarbon remains not cracked due to a low temperature of the side wall. And, as mentioned above, when steam is fed in a filmy state along the internal side wall of the combustion chamber, heat loss can be further improved.

The reaction chamber is not limited to a fanwise tubular one as shown in FIG. 2, but it may be such a straight tubular one as is known. However, in this invention, in connection with providing of the reverse frustoconical space, it is preferable that the reaction chamber is a fanwise tubular one. The reason therefore is that it makes the pressure drop at the reaction chamber smaller than the straight tubular one.

Next, this invention will be explained with reference to examples, however, it should be understood that these examples would not limit this invention.

EXAMPLE 1

An apparatus same as that shown in the drawings consisting of a cylindrical combustion chamber consisting of a heat resistant steel 486 mm. in diameter and 243 mm. in height provided with two double-tube burners and a fanwise tubular reaction chamber consisting of a refractory material was used. By feeding 182 Nm.³/hr. of a fuel (cracked gas), 50 kg./hr. of steam to be fed with the fuel and 176 Nm.³/hr. of oxygen into the combustion chamber to form a combustion gas, at the same time, by feeding steam in a filmy state along the internal side surface of the combustion chamber at a ratio of 150 kg./hr., a high-temperature swirling gas stream was formed. From the longitudinal slit at the tip of feed nozzle (existing inside a reverse frustoconical space), naphtha was injected at a ratio of 302 liters/hr. to the wall surface of the reverse frustoconical space at a right angle therewith, whereby the naphtha was mixed with the swirling gas stream.

The result was as follows. The result of the case wherein the tip of a hydrocarbon feed nozzle is provided 50 mm. above the reverse frustoconical space and naphtha was injected in a direction of the axis of the nozzle (viz. downwardly) was shown as Control 1 and the result of the case wherein exactly the same apparatus as mentioned above except the reaction chamber was made of a metal was used and operated under exactly the same condition was shown as Control 2 in Table 1.

TABLE 1

|  | This invention | Control 1 | Control 2 |
| --- | --- | --- | --- |
| Amount of gas produced (Nm.³/hr.) | 513 | 540 | 498 |
| Composition of a gas produced (vol. percent): |  |  |  |
| $N_2$ | 0.8 | 0.8 | 0.9 |
| CO | 21.8 | 23.7 | 20.5 |
| $CH_4$ | 8.1 | 8.0 | 9.5 |
| $CO_2$ | 25.7 | 25.0 | 27.3 |
| $C_2H_2$ | 9.0 | 7.0 | 6.5 |
| $C_2H_4$ | 8.9 | 6.0 | 9.5 |
| $H_2$ et al | 25.5 | 29.5 | 25.8 |

In Control 1, formation of carbon was intensive, after about 10 hours the reaction chamber was filled with carbon and the operation became impossible, however, in the example of this invention, after carrying out a continuous operation for about 50 hours, any carbon was not found at the wall of the reaction chamber and yields of acetylene and ethylene were improved by about 30%.

In Control 2, yield of acetylene was worse than that in the case of this invention and in order to obtain acetylene and ethylene about the same amounts of those in the example of this invention, further fuel and oxygen were required.

EXAMPLE 2

Using an apparatus similar to that used in Example 1 but had about a triple capacity was used in cracking naphtha. Concerning cases wherein steam was introduced in a filmy state along the side wall surface from the slit provided in a longitudinal direction at the side wall of the combustion chamber and steam was not introduced, lost calorie amounts and lost colorie ratio were compared and shown in Table 2.

TABLE 2

| | Introduced steam from the slit | Not introduced steam from the slit |
|---|---|---|
| Total input calorie to the combustion chamber ($T_s$ cal./hr.) | 2,180 | 2,140 |
| Amount of steam of burners (kg./hr.) | 150 | 350 |
| Amount of steam of the slit (kg./hr.) | 200 | |
| Lost calorie amount ($T_s$ cal./hr.) | 250 | 448 |
| Lost calorie ratio (percent) | 11.4 | 21 |

What is claimed is:

1. An apparatus for thermal cracking of a hydrocarbon to produce acetylene and ethylene which comprises a vertical cylindrical combustion chamber made of a heat resistant steel having at its outer periphery a water cooling jacket, a group of burners in tangential directions to the side of the combustion chamber and directing fuel toward the inside of said combustion chamber provided at regular intervals for completely combusting a fuel gas and oxygen, a plurality of slits for feeding steam provided longitudinally inside the side wall of said combustion chamber at regular intervals, a tubular reaction chamber made of a refractory material provided adjacent to and below said combustion chamber, a quenching device for cooling a cracked gas at the exit portion of said reaction chamber and a hydrocarbon feed nozzle provided inside said combustion chamber from outside by penetrating said chamber along its axis said apparatus being characterized in that a connecting portion of said combustion chamber to said reaction chamber forms a reverse frustoconical space, the inclination of the peripheral wall of said reverse frustoconical space to the lower wall surface of the combustion chamber being 30° to 60°, said hydrocarbon feed nozzle being so provided that the opening or slit at the tip thereof is located inside said reverse frustoconical space and is directed to the peripheral wall of said space at an angle of 30° to 150°, the said nozzle being adjacent the reverse frustoconical wall.

2. An apparatus of claim 1 wherein said reaction chamber is a fanwise tube.

3. An apparatus of claim 1 wherein said reaction chamber is a straight tube.

References Cited

UNITED STATES PATENTS

| 2,750,420 | 6/1956 | Hepp | 208—130 |
| 2,790,838 | 4/1957 | Schrader | 23—277 |
| 2,794,316 | 6/1957 | Winternitz | 60—205 |
| 3,047,371 | 7/1962 | Krause et al. | 23—284 |

FOREIGN PATENTS

| 889,259 | 2/1962 | Great Britain. |

NORMAN YUDKOFF, Primary Examiner

DAVID EDWARDS, Assistant Examiner

U.S. Cl. X.R.

23—284; 196—119, 128; 208—130, 132; 260—683